Jan. 5, 1926.  
G. TOLMAN  
CULTIVATOR SHOVEL  
Filed May 12, 1923  
1,568,484
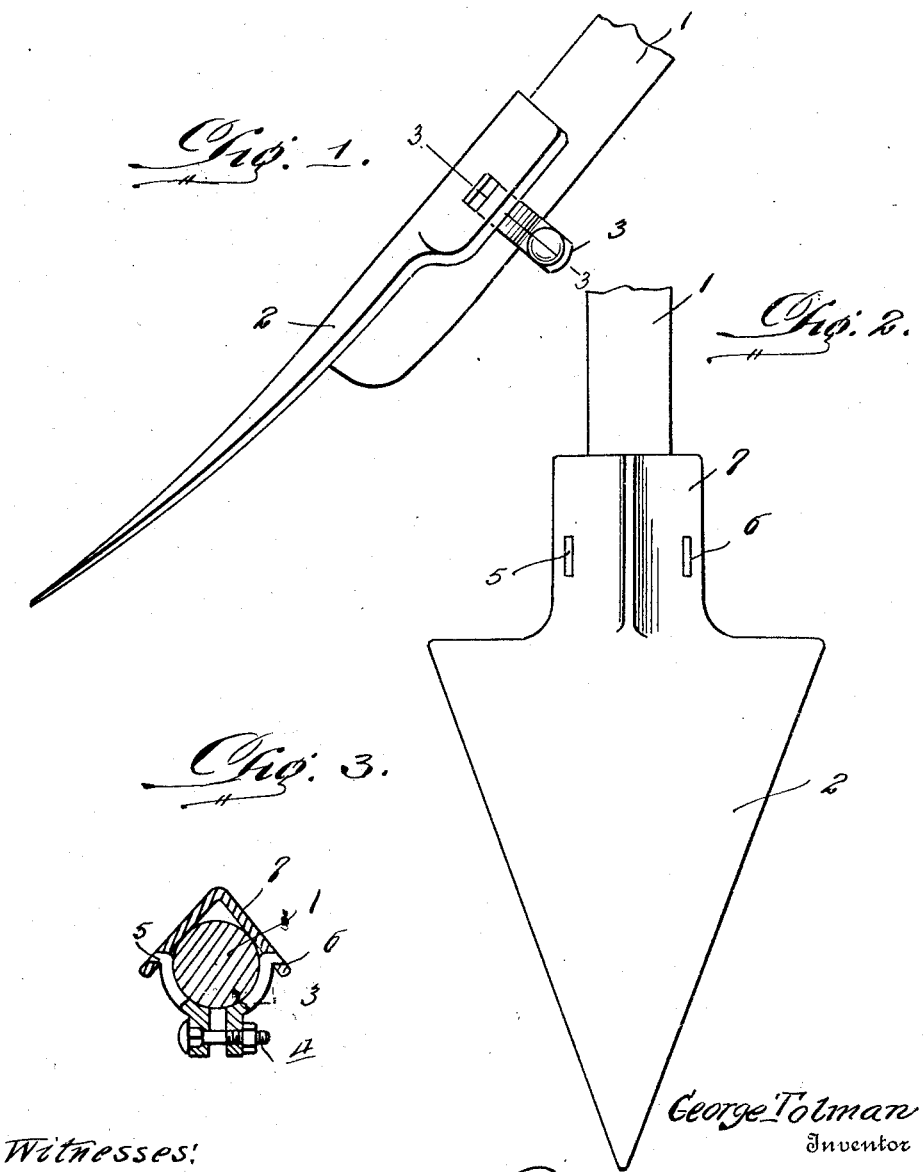

Patented Jan. 5, 1926.

1,568,484

UNITED STATES PATENT OFFICE.

GEORGE TOLMAN, OF SHELDON, IOWA.

CULTIVATOR SHOVEL.

Application filed May 12, 1923. Serial No. 638,601.

*To all whom it may concern:*

Be it known that I, GEORGE TOLMAN, a subject of the Queen of the Netherlands, residing at Sheldon, in the county of O'Brien and State of Iowa, U. S. A., have invented certain new and useful Improvements in Cultivator Shovels, of which the following is a specification.

This invention has reference to cultivator shovels and its object is to provide a shovel which does not require an extra back riveted thereto and wherein the shank of the shovel is immediately adjacent to the shovel blade and thereby provides additional clearness under the shovel and prevents any prying of the clips or bolts from the shovel.

Moreover, the construction employed renders it possible to set the shovel blade more on a slant or more nearly level than other shovel blades because of the shank being close to the shovel. Furthermore, the shovel can be used as long as there is any material left because there is no back to be in the way.

The invention will be best understood from a consideration of the following detailed description taken in connection with the accompanying drawings forming part of this specification with the understanding, however, that the invention is not confined to any strict conformity with the showing of the drawings but may be changed and modified so long as such changes and modifications mark no material departure from the salient features of the invention as expressed in the appended claims.

In the drawings:

Figure 1 is a side elevation of a cultivator shovel embodying the invention;

Figure 2 is a face view of the shovel shown in Figure 1;

Figure 3 is a section on the line 3—3 of Figure 1.

Referring to the drawings, there is shown a shovel stem 1 of substantially round cross section and carrying a shovel blade 2 of spear shape, the blade being held to the stem by a clip or yoke 3 secured in place by a bolt 4. The clip or yoke 3 is composed of two opposed members together constituting the clip or yoke 3 and these two members terminate in outstanding tongues 5, the terminal portions of which pass through eyes 6 produced in a neck 7 on opposite sides of the stem 1 and offset with relation to the clip 3 to anchor in the neck 7 of the shovel.

The neck 7 is so shaped as to snugly fit the stem 1 so that the stem 1 is tightly embraced by the neck 7 either producing a close fit between the stem 1 and the neck 7 as an angular conformation to produce the snug fit desired.

The arrangement is such that no riveting is needed between the neck 7 and the stem 1 and more clearance is provided underneath the neck 7 than with other modes of fastening these parts together.

What is claimed is:

A cultivator shovel of the class described comprising a body in the form of a single piece of material including a relatively wide portion forming a blade, and a relatively narrow portion forming an attaching neck, said neck being substantially V-shaped in cross section, and being adapted for reception of a handle, the apex thereof to be spaced from said handle, said neck being provided with oppositely disposed openings, and clamping means for connecting the neck to the handle, said clamping means comprising a pair of duplicate members formed at their free ends with laterally directed hooks for reception in said opening, curved intermediate their ends to conform to the contour of the handle, and provided with ears having openings for passage of a retaining bolt.

Signed at Sheldon, in the county of O'Brien, and State of Iowa, this 24th day of January 1924.

GEORGE TOLMAN.